Oct. 22, 1963   E. E. SCOTT   3,107,441
TELLURION
Filed March 28, 1962   4 Sheets-Sheet 1
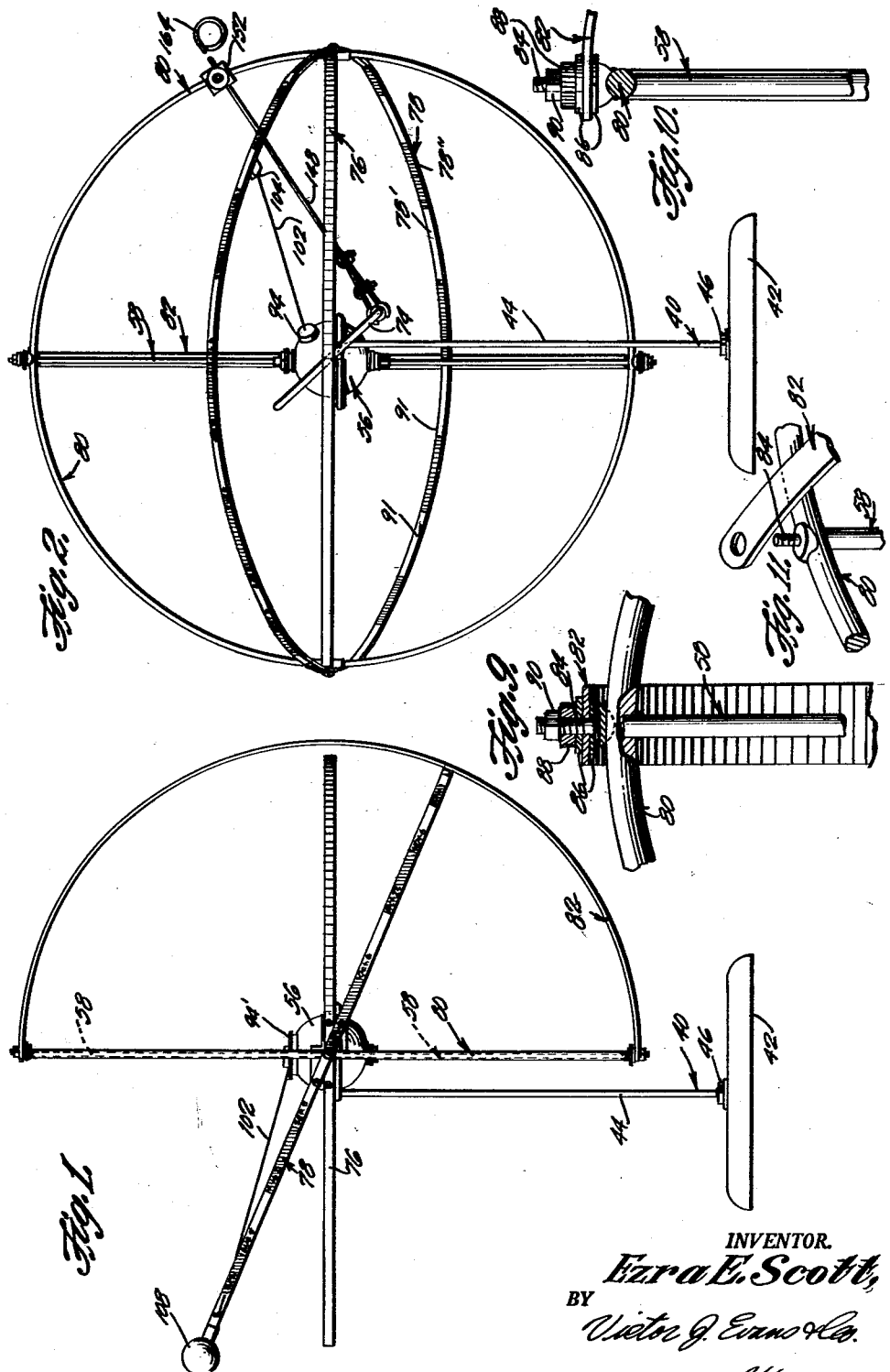
INVENTOR.
Ezra E. Scott,
BY
Victor J. Evans & Co.
Attorneys

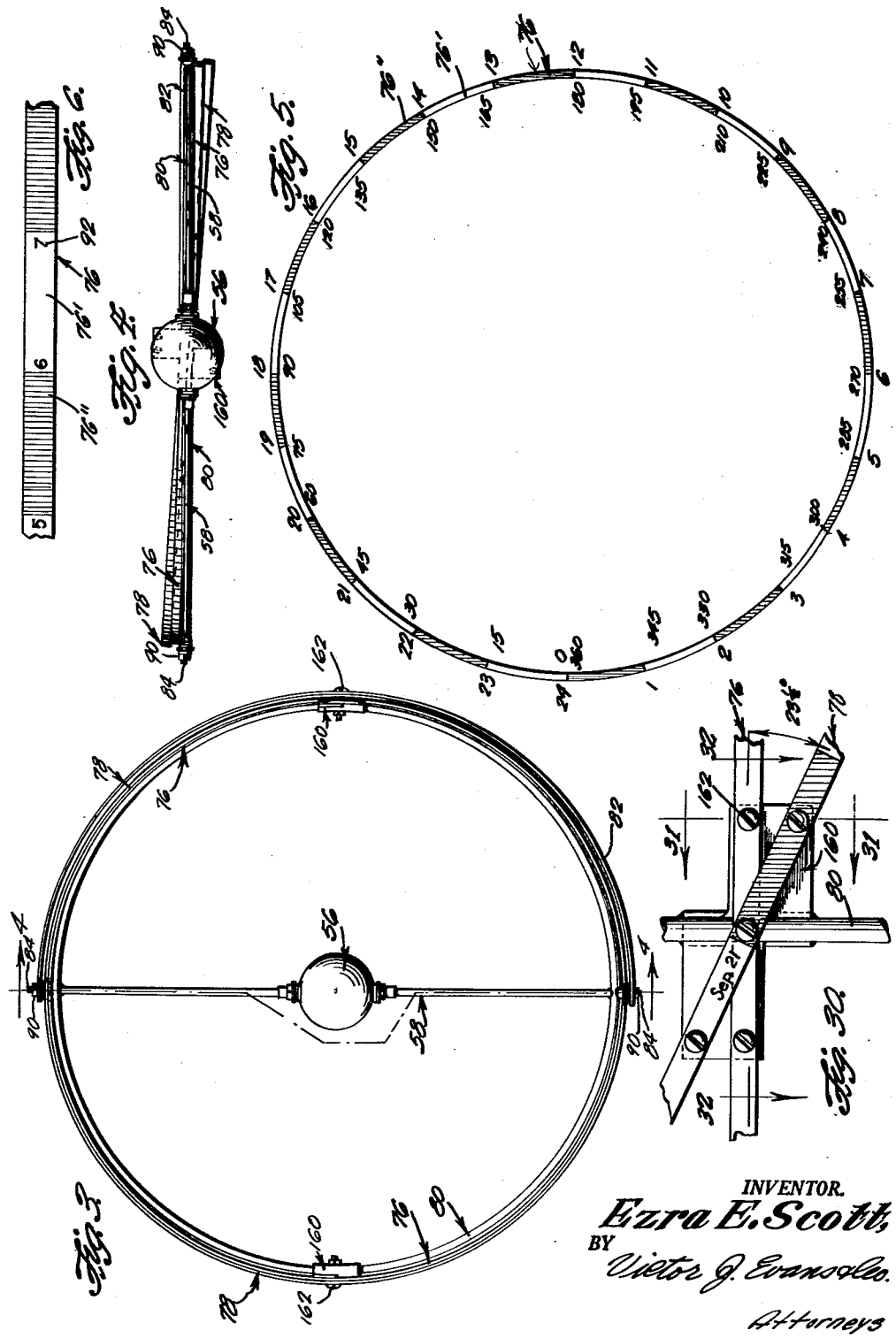

Oct. 22, 1963     E. E. SCOTT     3,107,441
TELLURION
Filed March 28, 1962     4 Sheets-Sheet 3
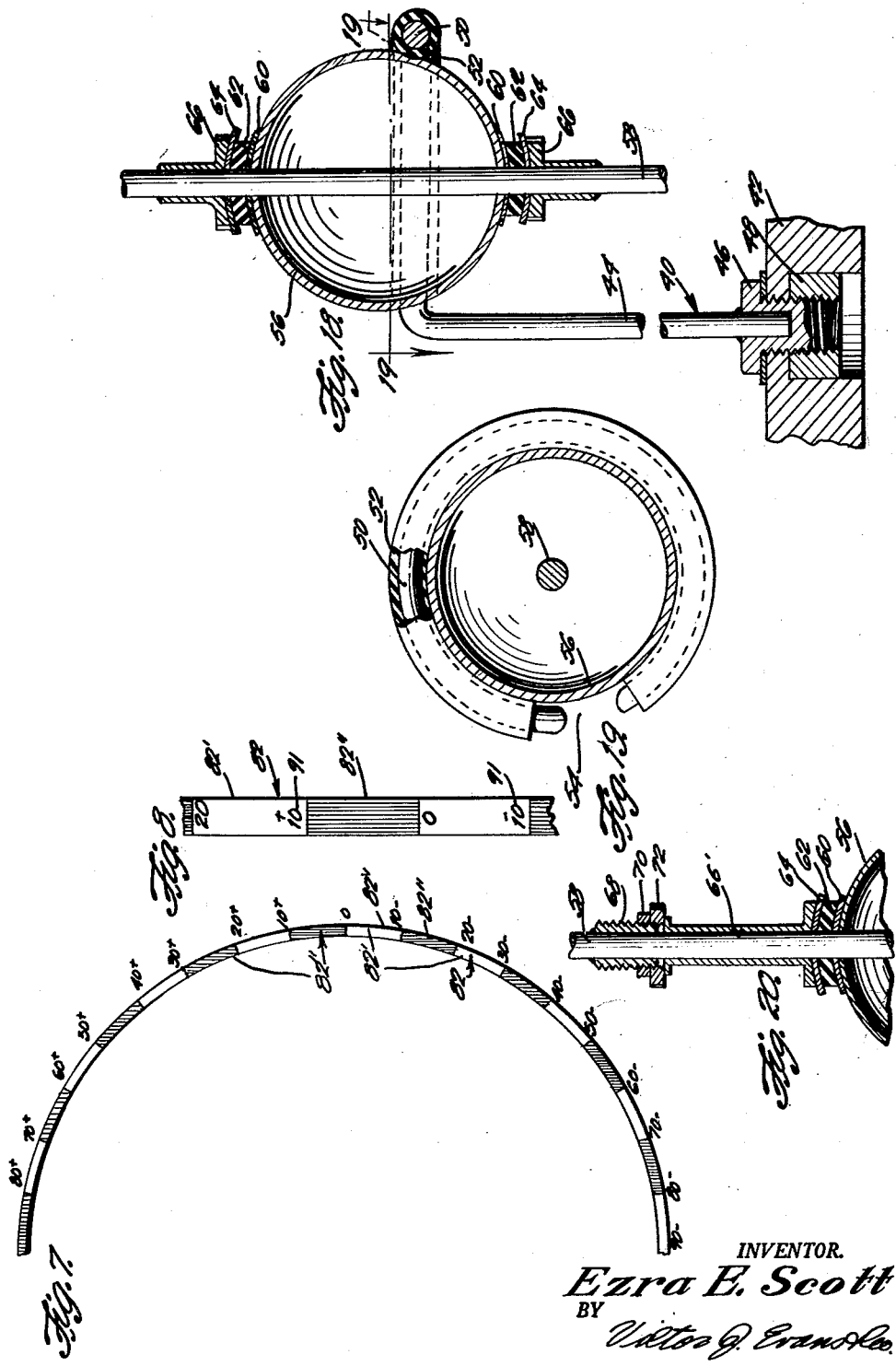
INVENTOR.
Ezra E. Scott

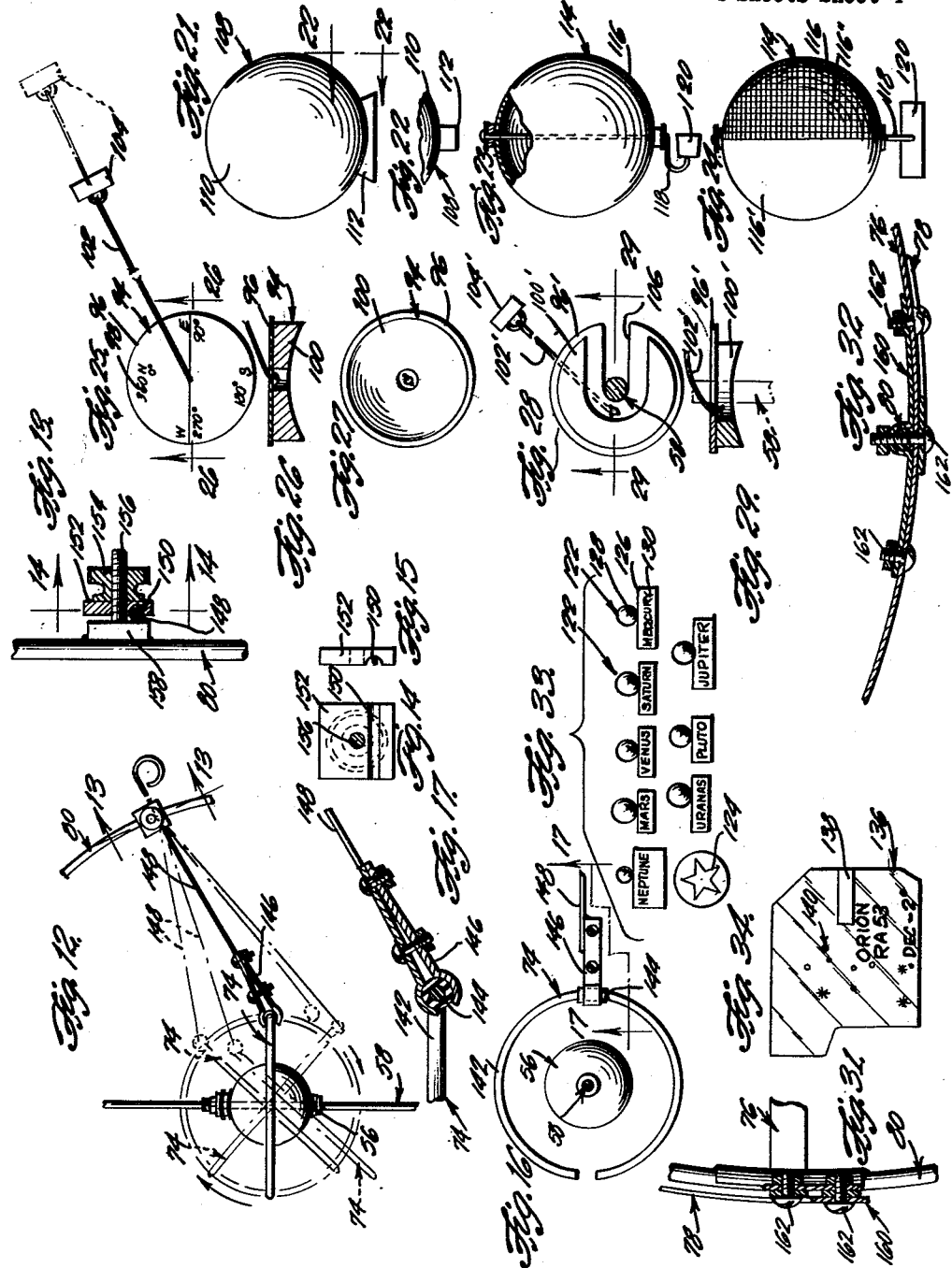

United States Patent Office 3,107,441
Patented Oct. 22, 1963

3,107,441
TELLURION
Ezra E. Scott, 2708 Hayes St., Belmar, N.J.
Filed Mar. 28, 1962, Ser. No. 183,196
1 Claim. (Cl. 35—45)

The present invention relates to an educational device for the visual teaching of geography, navigation, and astronomy.

In the teaching of subjects which relate to the relative movement of the earth and sun, earth and moon, or the movement of the stars and planets relative to the earth or sun, a primary difficulty is generally experienced because the person being taught frequently cannot picture in his mind the true situation of the earth rotating on its axis and at the same time rotating about the sun while the moon rotates about the earth and the stars and planets are fixed or moved relative to the sun.

A part of this difficulty is believed to stem from the fact that a person always sees himself as standing on the top of the world and that for all intents and purposes, as far as that person is concerned, the earth is flat.

The primary object and purpose of the present invention is to provide a device which correlates this particular misconception or fallacy with the actual facts and in a visual manner readily understandable.

Another object of the present invention is to provide an educational device which has a simulated horizon means so that a person may visualize himself at any selected point on earth and visually see the movements of simulated stars, sun, moon, and planets relative to that point on earth, and visually see the changing movement of the orbit of a simulated satellite.

A further object of the present invention is to provide an educational device of simple construction, one economical to manufacture and assemble, and one which lends itself to manufacture in such sizes as to be suitable for the teaching of individuals, or large or small groups of persons.

These and other objects and advantages of the present invention will be fully apparent from the following description when taken in connection with the annexed drawings, in which:

FIGURE 1 is an elevational view of the device of the present invention,

FIGURE 2 is another elevational view of the device, taken at ninety degrees to the view of FIGURE 1, FIGURE 3 is a plan view of the device in folded condition, FIGURE 4 is a view taken on line 4—4 of FIGURE 3, FIGURE 5 is a plan view of the equator ring removed from the device, FIGURE 6 is an enlarged view of a portion of the ring shown in FIGURE 5, FIGURE 7 is a plan view of the meridian semi-circle, removed from the device, FIGURE 8 is an enlarged view of a portion of the meridian semi-circle shown in FIGURE 7, FIGURE 9 is a detailed fragmentary view of the connection of the prime meridian ring and meridian semi-circle to the polar axis, FIGURE 10 is a view of the portion of the device shown in FIGURE 9, taken at ninety degrees to FIGURE 9, FIGURE 11 is a perspective exploded view of the connection shown in FIGURES 9 and 10, with the nut and washers removed therefrom, FIGURE 12 is a view of a portion of the device showing in full and dotted lines various positions of a satellite orbit path ring, FIGURE 13 is a fragmentary view, on an enlarged scale, taken on the line 13—13 of FIGURE 12, FIGURE 14 is a view taken on the line 14—14 of FIGURE 13, FIGURE 15 is a view of the part shown in FIGURE 14 taken at ninety degrees to FIGURE 14, FIGURE 16 is a fragmentary view of the satellite ring shown in FIGURE 12, FIGURE 17 is a view, on an enlarged scale, taken on the line 17—17 of FIGURE 16, FIGURE 18 is an enlarged sectional view with parts broken away of the earth globe and the standard, FIGURE 19 is a view taken on line 19—19 of FIGURE 18, FIGURE 20 is a modified form of the connection of the earth globe to the support rod, FIGURE 21 is an elevational view of the sun globe, FIGURE 22 is a fragmentary view taken on line 22—22 of FIGURE 21, FIGURE 23 is an elevational view with a part broken away of the moon globe, FIGURE 24 is another elevational view of the moon globe taken at ninety degrees to FIGURE 23, FIGURE 25 is a top plan view of the simulated horizon element, showing in full and dotted lines the simulated sight line member in two positions, FIGURE 26 is a sectional view on line 26—26 of FIGURE 25, FIGURE 27 is a bottom plan view of the element shown in FIGURE 25, FIGURE 28 is a top plan view of a modified form of the element shown in FIGURE 25, FIGURE 29 is a sectional view on line 29—29 of FIGURE 28, FIGURE 30 is a plan view of the connection of the ecliptic ring and equator ring to the support ring, FIGURE 31 is a view taken on line 31—31 of FIGURE 30, FIGURE 32 is a view taken on line 32—32 of FIGURE 30, FIGURE 33 is a plan view of the simulated planet elements, and FIGURE 34 is a plan view of a simulated constellation element.

With further reference to the drawings in detail, in FIGURES 1, 2, 3 and 18, the numeral 40 represents generally a standard having a base 42 and an upright rod or support 44 rising from the base 42.

In FIGURE 18 it will be seen that a lower end of the support 44 is welded in a nipple 46 which is threadedly engaged in a bushing 48.

The upper end of the rod or support 44 is bent to have a horizontal portion 50 formed to a circle, as shown best in FIGURE 19.

The circular portion 50 of the support 44 forms a supporting clamp which is covered with a resilient material such as rubber tubing as at 52 in FIGURE 19. The free end of the support portion 50 is spaced from the upper end of the upright part so as to form an egress opening 54 (FIGURE 19) into the circle formed by the portion 50.

Lightly clamped and supported by the tubing 52 is an earth globe 56, fabricated of a magnetically attractive material, and rotatably supported upon a polar axis member 58.

The means for mounting the earth globe 56 on the polar axis member 58 is shown in detail in FIGURE 18 and includes two discs of a friction producing material such as sandpaper glued or otherwise secured to the poles of the earth globe 56. The discs are indicated by the reference numeral 60. Exteriorly of the discs 60 and in frictional engagement therewith are rubber washers 62, other discs 64, fabricated of friction producing material such as sand paper or the like, and a bushing 66 fixedly secured to the polar axis member 58 by soldering, welding, or other suitable means.

In FIGURE 20 a modified form of the attachment or connection of the earth globe 56 to the polar axis member 58 is shown in which the sand paper discs 60 and 64 are present sandwiching therebetween the resilient washer 62 but in which the bushing 66' is elongated. A threaded sleeve 68 is securely fixed to the polar axis member 58. Threaded on the portion 68 are nuts 70 and 72, the latter bearing against the upper end of the bushing 66' and holding the same in engagement with the adjacent discs 64. The nut 70 locks the nut 72 against inadvertent movement.

With continued reference to FIGURES 1 and 2, circumposed about the earth globe 56 are equator ring 76 and ecliptic ring 78. These rings 76 and 78 are supported at opposed points on a support ring 80 one-half of which is colored so as to designate it as the prime meridian. The polar axis member 58 has its ends secured in the support ring 80, as shown in FIGURES 9, 10, and 11, in which one end of the member 58 is shown with the adjacent portion of the ring 80.

This point of connection of the support ring 80 to the polar axis member 58 is also the point of connection of a movable meridian semi-circle 82. The semi-circle 82 is secured to the reduced end portions 84 of the member 58 by means of a pair of lock washers 86 and nuts 88 and 90. The nut 90 on the reduced end portion 84 of the member 58, with the nut 88, secures the end portion of the movable medidian semi-circle 82 to the member 58 with suitable frictional engagements therebetween so that the semi-circle 82 may be positioned about the globe 56 as desired and so that it will hold such position until again moved.

With reference to FIGURES 7 and 8, the movable meridian semi-circle 82 is shown to be provided with painted sections 82' and 82", preferably of contrasting colors such as white and red, respectively. Also, indicia, as at 91 is provided (FIGURE 8) to represent the degrees of declination north and south of the equator with each section 82', 82" bearing a gradation of such indicia.

With reference to FIGURES 5 and 6, the equator ring 76 is also provided with oppositely colored sections 76' and 76" which bear on their inner base indicia representing degrees of a circle. On the outer faces of the sections are indicia 92 representing units of right ascension in hours, from zero to twenty-four.

The above described rings 76 and 78, with the semicircle 82 constitute in essence a celestial sphere circumposed about the earth globe 56.

An important feature of the invention resides in a simulated horizon element 94 which is positionable upon the globe 56 so as to represent the point on the earth on which a person stands with the horizon viewed from such points simulated by the element 94. The element 94 consists in a flat disc 96 having about the periphery thereof indicia 98 representing points of a compass.

On the underface of the disc 96 are secured one or more magnets 100 each preferably having a concave face conformably shaped to the surface of the earth globe 56.

Working in conjunction with the disc 96 is a simulated line of sight member 102 operatively connected to the disc 96 and having means for removably attaching one end thereof to any one of the rings 76, 78, or the semi-circle 82. This means consisting of a small magnet 104. One end of the member 102 is fixedly secured to the disc 96 at the center thereof, the member 102 being fabricated from an elastic material so that it will stretch, and remain in a straight line when the distance between the ends varies due to rotation of the rings 76, 78 or the semi-circle 82 about the axis, as shown in FIGURE 25. When the globe 56 is held with the element 94 uppermost and with the disc 96 horizontal, a person holding the globe 56 at eyelevel may see the moon for instance when placed on the circle 78 at the proper month, at a point in the sky above the level of the disc 96 according to the proper lunar table. When below the level of the disc the moon will not be visible over the edge of the disc. The member 102 represents the line of sight of the person holding the globe.

In the form of the invention shown in FIGURES 28 and 29, the disc 96' is provided with a slot 106 which permits it to be positioned upon the earth globe 56 so as to surround the adjacent portion of the polar axis member 58. An elastic cord 102' serves as the line of sight member and carries on one end the magnet 104', the other end being secured to the disc 96'. The under face of the disc 96' carries magnets 100' as shown in FIGURE 29.

The magnets 100, 100' constitute means for removably holding the simulated horizon elements 94, 94' in position on the globe 56.

In FIGURES 21 and 22 there is shown a simulated sun element 108 which consists of a ball 110 having affixed to one side thereof a magnet 112.

In FIGURES 23 and 24 a simulated moon element is shown at 114 and which consists in a ball 116 mounted for rotation about an axis or axle 118. One end of the axle 118 projects outwardly over the ball 116 and carries on its free end a magnet 120.

The ball 116 is divided into two hemispherical sections 116' and 116" of contrasting colors such as white and black.

With reference to FIGURE 33, a group of simulated planets and a simulated star are shown, as at 122 and 124 respectively. Each planet 122 consists of a magnet 126 and a ball 128 secured to the magnet 126, each magnet bearing indicia as at 130 with reference to the magnet 126 on the right hand side of FIGURE 33. Preferably each ball 128 is colored a bright color, such as yellow, so as to be readily seen when used.

In FIGURE 34 the numeral 136 represents a sheet of plastic which is preferably shaped to the outline of a chosen constellation. On the sheet 136 is secured a magnet 138 and indicia in the shape of conventional star shape or dots representing stars in a constellation. The star and constellation indicia, in FIGURE 34 is designated by the numeral 140.

Referring to FIGURES 12 to 17, inclusive, the above mentioned simulated satellite orbit path member 74 will be described. This member 74 consists in a split ring 142 carrying a resilient bushing 144 which is clamped between the arms of a clamp 146 on the end of a rod 148. The other end of the rod 148 extends slidably through a groove 150 in one face of a block 152 which is held by a knurled nut 154 on a bolt 156 projecting from another block 158 welded to the support ring 80, as shown most clearly in FIGURE 13.

There is shown in FIGURES 3 and 4, the rings 76, 78 and 80 which may be folded together so as to make a compact package readily transportable. This is made possible by the connection of the rings 76 and 78 to the support ring 80, as shown most clearly in FIGURES 30 31, and 32. This connection includes a plate 160 and fastening elements or bolts 162 which may be removed to free the ring 78 and the ring 76 from the ring 80.

When used as a teaching aid, the device of the present invention is employed as follows.

Either the element 94 is placed on the earth globe 56, as in FIGURE 2 or the element 94' is placed on the globe 56 as in FIGURE 1. In either case, the element 94 is positioned on the globe 56 and the globe is removed from the upper end of the standard 40 and held in one hand with the disc 96 of the element 94 horizontal and at about eye level. The stretchable member 102 is then pulled outwardly and the magnet 104 is placed upon one of the rings 76 or 78. In FIGURE 1 the sun element 108 has been positioned on the ecliptic ring 78 and the member 102 stretched outwardly so that the magnet 104 attaches itself to the inner face of the ring 78 at a point opposite to the sun element 108.

Now, with the earth held in one hand and the disc 96 horizontal, the support ring 80 is swung about the earth so that the sun element moves from a position below the horizon simulated by the flat disc 96 to a point on the other side of the disc and again below the horizon. Its path across the sky will be noted by the person using the device of the present invention.

The obvious use of the device of the present invention will be to show the path of the sun for any day of the year and to show the relative position of the moon with the white side of the moon always facing the sun.

The teaching will also include the placing of any one of the planets upon the ecliptic circle 78 at the point in the sky referenced by the proper astronomical chart for the year and date as available commercially.

Similarly, the plastic sheet 136 may be secured on the ring 78 or the ring 76, or on the semi-circle 82 in a position to represent the actual position of a constellation in the sky and at the proper location in the sky as dictated by the astronomical chart available.

In each case, the stretchable member 102 may extend from the disc 96 to the star, planet, sun, or moon, as desired and the path of the celestial object may be traced and visually watched by the movement of the member 102 relative to the upper face of the disc 96. This will show the rising and falling of the celestial object with reference to the point on earth where the person imagines himself to be standing.

Obviously, this is a teaching aid for both the Northern and Southern Hemispheres and a person may readily understand why a person at the North or South Pole experiences a summer in which the sun never sets and a winter in which the sun never rises.

The use of the simulated satellite orbit path member 74 is as follows. Adjustment of the member 74 is accomplished by loosening the nut 154 and the clamp 146 and moving the member 74 to the desired position relative to the globe 56. Tightening of the nut 154 and the clamp 146 will result in holding the member 74 in a position fixed with respect to the celestial globe. Now, holding the globe 56 stationary and with the element 94, 94' in place on the globe 56, and the disc 96, 96' in a horizontal position, rotation of the rings 76, 78 and 80 about the stationary globe 56 will shift the satellite member 74 in a manner which represents the shifting of an actual satellite path with respect to the earth.

The present invention makes provision for holding the earth globe 56 on the polar axis member 58 in a condition of restraint which may be adjusted by loosening the proper nuts and freeing the discs 60 and 64 from their engagement with the washers 62. These are frictional engagements and restrain the free movement of the globe relative to the member 58. Similarly, the movable meridian semi-circle 82 is restrained from free movement by its lock washers 86 and washer 88.

It will be seen therefore that when the proper astronomical table such as the right ascension table is employed the position of any star or planet or the position of the sun or moon may be determined and with the use of the semi-circle 82 and the proper sun element or moon element or star element, the element can be placed on the celestial globe in a position which will be readily translatable to actual appearance of the star when it is above the horizon of the earth.

Other uses will be found for the device of the present invention and while a preferred embodiment of the invention has been shown and described other embodiments are contemplated and numerous changes and modifications may be made therein without departing from the spirit of the invention as set forth in the appended claim.

What is claimed is:

In an educational device including a celestial sphere having an earth globe, a polar axis member extending through said globe, an equator ring circumposed about said globe, an ecliptic ring circumsposed about said globe, a meridian ring circumposed about said globe, means securing said equator and ecliptic rings to said polar axis member, and means movably connecting said meridian ring to said polar axis member, the combination of a simulated horizon element positionable on said globe so as to represent the point on earth on which a person stands with the horizon viewed from such point simulated by said element, and a simulated line of sight member operatively connected to said element and having means for removably attaching one end of said member to either said meridian ring or said ecliptic ring, and simulated sun, moon, planet, star, and constellation elements selectively positionable upon and removably attachable to said rings.

References Cited in the file of this patent

UNITED STATES PATENTS

| 41,938 | Perce | Mar. 15, 1864 |
| 320,999 | Berneike et al. | June 30, 1885 |
| 482,278 | Slater | Sept. 6, 1892 |
| 1,183,068 | Johnson | May 16, 1916 |
| 1,189,141 | Lanneau | June 27, 1916 |
| 2,185,556 | Johnson | Jan. 2, 1940 |
| 2,545,409 | McCall | Mar. 13, 1951 |
| 2,687,582 | Storz | Aug. 31, 1954 |

FOREIGN PATENTS

| 826,798 | Germany | Jan. 7, 1952 |
| 240,604 | Great Britain | Oct. 8, 1925 |